United States Patent
Grubbauer et al.

(10) Patent No.: US 12,535,276 B2
(45) Date of Patent: Jan. 27, 2026

(54) HEAT EXCHANGER FOR AN INTERNAL COMBUSTION ENGINE

(71) Applicant: Bayerische Motoren Werke Aktiengesellschaft, Munich (DE)

(72) Inventors: Martin Grubbauer, St.Peter/Au (AT); Thomas Waldhaeusl, Karl (AT)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 211 days.

(21) Appl. No.: 18/564,672

(22) PCT Filed: Jun. 24, 2022

(86) PCT No.: PCT/EP2022/067292
§ 371 (c)(1),
(2) Date: Nov. 28, 2023

(87) PCT Pub. No.: WO2023/001487
PCT Pub. Date: Jan. 26, 2023

(65) Prior Publication Data
US 2024/0263885 A1    Aug. 8, 2024

(30) Foreign Application Priority Data
Jul. 22, 2021  (DE) ..................... 10 2021 119 023.1

(51) Int. Cl.
*F28D 9/00*     (2006.01)
*F28F 9/00*     (2006.01)
(52) U.S. Cl.
CPC ............ *F28D 9/0062* (2013.01); *F28F 9/005* (2013.01); *F28F 2225/04* (2013.01); *F28F 2225/06* (2013.01); *F28F 2230/00* (2013.01)

(58) Field of Classification Search
CPC ........ F28F 1/40; F28F 2230/00; F28F 9/0138; F28F 9/167; F28F 9/005; F28D 9/0062
See application file for complete search history.

(56) References Cited

U.S. PATENT DOCUMENTS

| 5,803,162 A | 9/1998 | Karbach et al. |
| 2007/0056721 A1* | 3/2007 | Usui ..................... F28D 7/1684 165/183 |

(Continued)

FOREIGN PATENT DOCUMENTS

| DE | 10 2006 041 985 A1 | 4/2007 |
| DE | 102014224517 A1 * | 6/2015 ......... F28D 21/0008 |

(Continued)

OTHER PUBLICATIONS

Translation of DE102014224517A1 named Translation—DE102014224517A1 (Year: 2015).*

(Continued)

*Primary Examiner* — Paul Alvare
(74) *Attorney, Agent, or Firm* — Crowell & Moring LLP

(57) ABSTRACT

A heat exchanger for an internal combustion engine for transmitting heat between at least two fluids. The heat exchanger has at least one fluid conduit device which has a fluid conduit device wall to separate the first fluid from a second fluid. The fluid conduit device wall delimits a plurality of fluid conduits for guiding the first fluid between the fluid inlet region and the fluid outlet region at least in part, at least parts of one of the fluid conduits having an undulating shape in the longitudinal extension direction of the fluid conduit device.

10 Claims, 4 Drawing Sheets

(56) References Cited

U.S. PATENT DOCUMENTS

| | | | | |
|---|---|---|---|---|
| 2007/0131404 A1* | 6/2007 | Overbury | ............ | F28D 1/05366 |
| | | | | 165/906 |
| 2017/0058842 A1* | 3/2017 | Grande Fernández | ...................... | |
| | | | | F28D 21/0003 |
| 2018/0266775 A1* | 9/2018 | Farlow | .................. | F28F 9/0131 |
| 2020/0325858 A1* | 10/2020 | Espinheira Rio | ......... | F28F 1/02 |
| 2022/0412661 A1* | 12/2022 | Palojoki | ................ | F28D 9/0025 |

FOREIGN PATENT DOCUMENTS

| | | | |
|---|---|---|---|
| DE | 10 2016 210 261 A1 | 12/2017 | |
| EP | 0 677 715 B1 | 6/1999 | |
| EP | 3135895 A1 * | 3/2017 | ................ F28F 1/40 |
| EP | 3 156 753 A1 | 4/2017 | |
| EP | 3 726 176 A1 | 10/2020 | |

OTHER PUBLICATIONS

International Search Report (PCT/ISA/210) issued in PCT Application No. PCT/EP2022/067292 dated Oct. 10, 2022 with English translation (5 pages).
German-language Written Opinion (PCT/USA/237) issued in PCT Application No. PCT/EP2022/067292 dated Oct. 10, 2022 woth English translation (9 pages).
German-language Office Action issued in German Application No. 10 2021 119 023.1 dated Mar. 8, 2022 (5 pages).

* cited by examiner

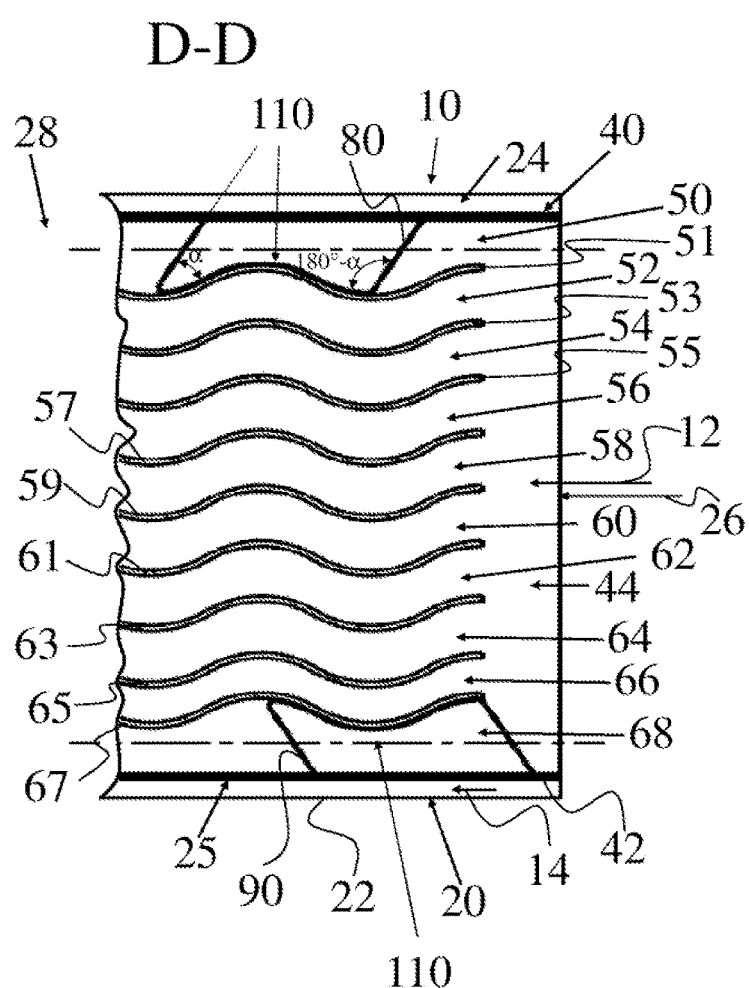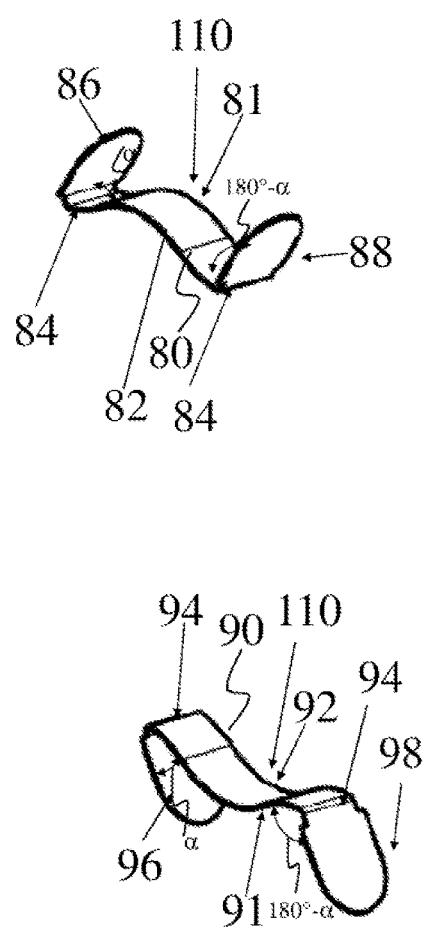
Fig. 3
Fig. 4

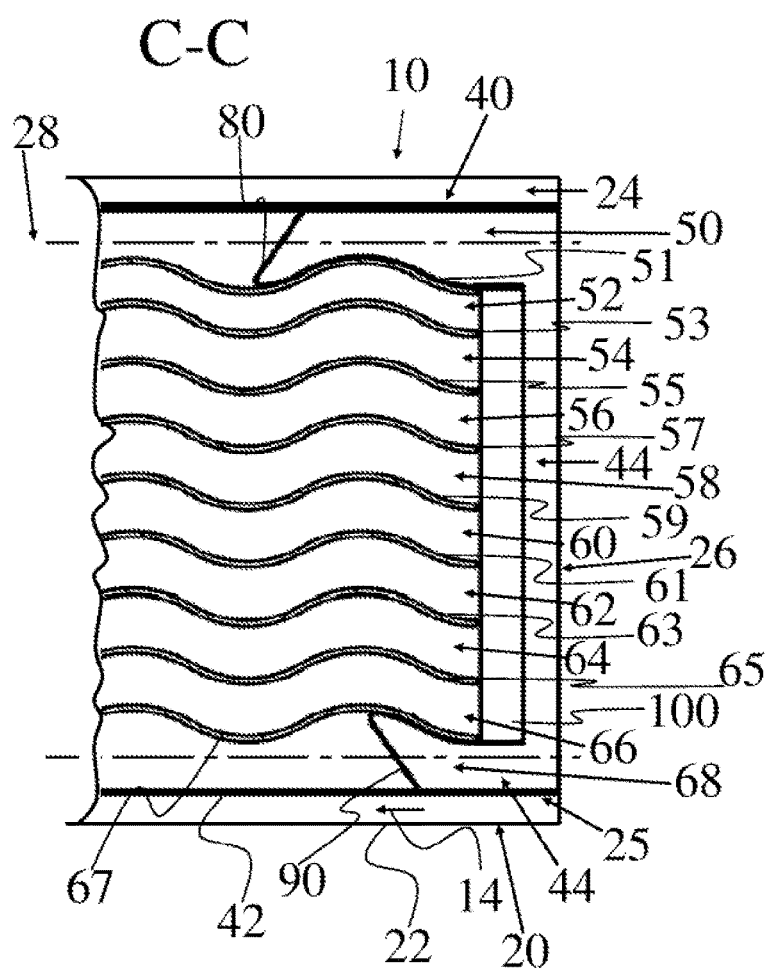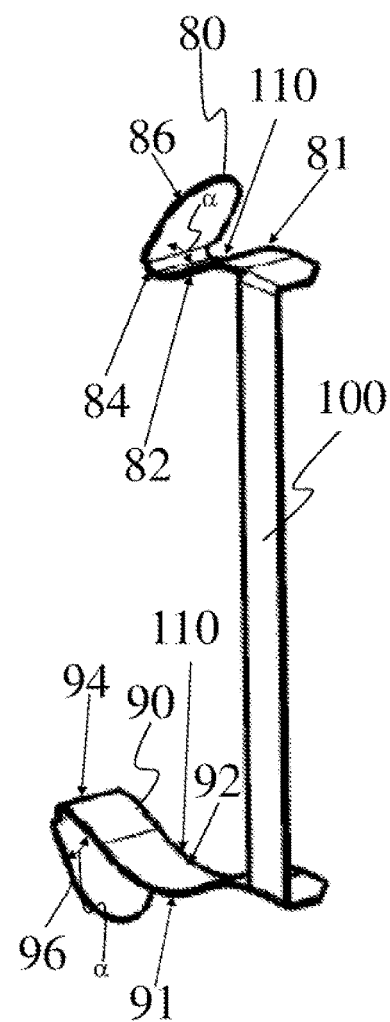
Fig. 7
Fig. 8

HEAT EXCHANGER FOR AN INTERNAL COMBUSTION ENGINE

BACKGROUND AND SUMMARY

The invention relates to a heat exchanger for an internal combustion engine. Further aspects of the invention relate to a fluid duct apparatus for a heat exchanger of this type, and to a method for producing a fluid duct apparatus of this type.

Heat exchangers of this type (also called heat recuperators) serve to transfer heat between fluids. In order to cool motor oil of an internal combustion engine, for example, the use of what are known as oil-coolant heat exchangers is customary. In the case of cold starting of the internal combustion engine, these oil-coolant heat exchangers can also be used to heat the engine oil and, as a result, what is known as warming up of the internal combustion engine can be accelerated.

Heat exchangers for internal combustion engines can also contribute directly to operation of the internal combustion engine with low raw emissions. One example of this is cooled exhaust gas recirculation (also shortened as EGR), in the case of which a part quantity of an exhaust gas emitted during operation of the internal combustion engine is removed from an exhaust gas section of the internal combustion engine, is cooled by means of a heat exchanger configured as an EGR cooler, and is subsequently fed to an intake section of the internal combustion engine. This cooled part quantity of the exhaust gas subsequently passes into respective combustion chambers of the internal combustion engine, and serves as what is known as a ballast gas during the combustion of a fuel-air mixture, as a result of which NOx raw emissions can be reduced significantly.

DE 10 2016 210 261 A1 has disclosed a heat exchanger for exchanging heat between a first fluid and a second fluid, it being possible for the first fluid to flow through the heat exchanger from a first end side to a second end side. The heat exchanger has at least two partition plates which separate flow regions, divided from one another for the first fluid and the second fluid, within the heat exchanger from one another. On at least one of the end sides of the heat exchanger, at least two adjacent partition plates each have a connecting region, in which they are connected to one another via a connection. The connection has at least one recess on the end side.

It is an object of the present invention to provide a heat exchanger which can be used in a flexible manner and has a permanently high degree of efficiency, a fluid duct apparatus for a heat exchanger of this type, and a method of the type mentioned at the outset.

This object is achieved by way of a heat exchanger, by way of a fluid duct apparatus, and by way of a method for producing such a fluid duct apparatus, in accordance with the independent claims. Advantageous refinements with expedient developments of the invention are specified in the dependent claims.

A first aspect of the invention relates to a heat exchanger for an internal combustion engine, for the transfer of heat between at least two fluids,
  (i) with at least one housing which has at least one housing wall and a housing interior space which is delimited at least in regions by means of the housing wall and has a fluid inlet region for introducing a first fluid of the at least two fluids into the housing interior space and a fluid outlet region for discharging the first fluid from the housing interior space, and
  (ii) with at least one fluid duct apparatus which is arranged in an interior space part region of the housing interior space and has a fluid duct apparatus wall which is configured to separate the first fluid from a second fluid and, at least in regions, delimits a plurality of fluid ducts of the fluid duct apparatus for conducting the first fluid between the fluid inlet region and the fluid outlet region, at least one of the fluid ducts having an undulating course at least in regions in the longitudinal extent direction of the fluid duct apparatus.

Here, the fluid inlet region and the fluid outlet region can be assigned both to the heat exchanger and the fluid duct apparatus. Undesired mixing of the first fluid with the second fluid can be prevented using the fluid duct apparatus wall. In other words, the fluid duct apparatus wall can therefore be configured to keep the first fluid separate from the second fluid, in particular within the housing interior space.

The first fluid can preferably be configured as an exhaust gas. The second fluid can preferably be configured as cooling water. The second fluid can be conducted separately from the first fluid between the fluid duct apparatus wall and the housing wall. The cooling water can preferably be a mixture of antifreeze and water, that is to say, for example, a water-glycol mixture. The second fluid can therefore be conducted in a part region of the housing interior space which is different than the interior space part region. Via the fluid duct apparatus wall, a transfer of heat can take place between the first fluid and the second fluid firstly in the form of thermal conduction, for example through the fluid duct apparatus wall, and secondly by way of forced convection on those surfaces of the fluid duct apparatus wall which face the respective fluids and lie opposite one another.

The heat exchanger can generally particularly preferably be configured as an exhaust gas heat exchanger, in particular as an EGR cooler, that is to say as an exhaust gas cooler which can be used for cooled exhaust gas recirculation. As a result of the undulating course at least in regions of the at least one fluid duct, preferably of all the fluid ducts of the plurality of fluid ducts, a throughflow of the fluid ducts with exhaust gas as the first fluid with cooling of the exhaust gas by way of the second fluid is possible, the undulating course bringing about a decreased sooting tendency of the fluid ducts. In other words, the undulating course which preferably extends, for example, over more than 90% of the fluid duct length of the fluid ducts, particularly preferably over the entire fluid duct length, brings it about that particularly low proportions of particulates and/or hydrocarbons contained in the exhaust gas are deposited in the long term with the configuration of an undesired insulation layer in the fluid ducts and, as a result, considerably impair the degree of efficiency of the heat exchanger over time. Although deposits of particles, in particular soot particles, and/or a condensation of hydrocarbons in the fluid ducts cannot be avoided completely, it has been shown that the contamination of the fluid ducts can be kept at a low level in the long term on account of the undulating contour, for example in comparison with tubular coolers with a circular tube cross section of the tubes which conduct exhaust gas.

It is provided according to the invention that the fluid duct apparatus comprises at least one supporting element which is arranged between a first fluid duct wall, which has the undulating course at least in regions and delimits a first outer fluid duct of the plurality of fluid duct at least in regions, and the fluid duct apparatus wall, and has a first supporting element region which is supported against the first fluid duct wall and is of complementary shape at least in regions with respect to the undulating course, the at least one supporting element being provided to seal the first outer fluid duct with respect to a passage of the first fluid. Within the context of the invention, the term "complementary" is to be understood to mean a uniform, preferably identical, embodiment. The first supporting element region can therefore be of undulating shape at least in regions just like the first fluid duct wall. As a result, the first supporting element region and the first fluid duct wall can bear against one another at least in regions along a contact region which is undulating at least in regions. Via the undulating contact region, the first supporting element region and the first fluid duct wall can bear against one another with the configuration of a positively locking connection which is undulating in regions, as a result of which firstly an undesired fluid flow of the first fluid through the undulating contact region, that is to say between the first fluid duct wall and the first supporting element region, can be minimized and secondly simple positional securing of the supporting element in the longitudinal extent direction can be ensured, since the undulating course can prevent undesired slipping of the at least one supporting element in the longitudinal extent direction.

The respective fluid ducts of the plurality of fluid ducts can preferably be arranged above one another, in particular above one another in the vertical extent direction of the fluid duct apparatus and therefore also of the heat exchanger. In addition, a plurality of fluid duct apparatuses of the heat exchanger can be arranged next to one another, in particular next to one another in the transverse extent direction of the fluid duct apparatus and therefore also of the heat exchanger. This makes a simple construction of the heat exchanger possible in an advantageous way.

The term "outer fluid duct" is to be understood to mean one of the fluid ducts of the fluid duct apparatus which is not arranged between two further fluid ducts of the plurality of fluid ducts of the fluid duct apparatus, but rather adjoins only one fluid duct of this fluid duct apparatus. The plurality of fluid ducts of the fluid duct apparatus can comprise, for example, ten fluid ducts, namely two outer fluid ducts and eight inner fluid ducts which are arranged between the outer fluid ducts. The term "inner fluid ducts" is accordingly to be understood to mean those fluid ducts which are arranged between the outer fluid ducts.

The invention is based on the finding that fluid ducts which lie on the outside, such as the first outer fluid duct, can have an increased contamination tendency in comparison with inner fluid ducts, which can be ascribed firstly to an inhomogeneous flow distribution in the region of the outer fluid ducts and secondly to the shape of the outer fluid ducts. While the inner fluid ducts can be delimited, for example, in the vertical extent direction of the fluid duct apparatus (and of the heat exchanger) on fluid duct sides which lie opposite one another by means of fluid duct walls which have the undulating contour at least in regions, with the result that the first fluid can be conducted through the inner fluid ducts on both sides along the undulating contour, fluid ducts which lie on the outside can have a different flow cross section which can be less favorable, for example, with regard to a sooting tendency, than the inner fluid ducts. Thus, outer fluid ducts can be routed, for example, only on one side by means of the (first) fluid duct wall along the undulating shape, whereas further duct walls of the first outer fluid duct can be formed by way of the fluid duct apparatus wall which is free from the undulating shape. In other words, the inner fluid ducts can therefore be delimited at least on duct sides which lie opposite one another by way of two fluid duct walls which can each be of undulating configuration at least in regions, whereas the outer fluid duct or the outer fluid ducts can be delimited only on one side by way of a (single) fluid duct wall and otherwise by way of the fluid duct apparatus wall which is free from the undulating shape, that is to say is not provided with the undulating contour.

The invention comes into play here, since the outer fluid duct is sealed effectively using the supporting element, and the supporting element is additionally secured positionally in the longitudinal extent direction on account of the shape of the first supporting element region. Therefore, the heat exchanger which has the at least one fluid duct apparatus can be used in a flexible manner, since the heat exchanger can be used, in particular with maintenance in the long term of a high degree of efficiency (degree of efficiency of the heat exchanger), not only to cool particle-free fluids, but rather also, above all, as an EGR cooler, that is to say to cool particle-containing and hydrocarbon-containing exhaust gas as the first fluid, it being possible, by way of the use of the supporting element, for the throughflow of the outer fluid duct which is susceptible to contamination with the (particle-containing) first fluid to be prevented at least largely and therefore an excessively pronounced contamination (sooting) of the heat exchanger to be counteracted effectively.

The undulating course particularly preferably has at least two curvatures which are different than one another with in each case different curvature directions. The undulating course can therefore preferably be curved to the left in regions and curved to the right in regions. As a result, there is particularly reliable positional securing of the supporting element with respect to undesired slipping (offset) in the longitudinal extent direction. In addition or as an alternative, the undulating course can preferably have at least one extreme point. Here, the term "extreme point" is to be understood in the mathematical sense, namely that the first derivation of a mathematical function which describes the undulating course has the value 0. In other words, the extreme point can be configured as a high point or as a low point in the context of curve sketching. If the undulating course has at least one extreme point, particularly advantageous positional securing and sealing can be achieved by way of an effective positively locking connection, since the first outer fluid duct can be engaged around in a positively locking manner at least in regions as a result.

In one advantageous development of the invention, the at least one supporting element has at least one second supporting element region which is connected to the first supporting element region and is at least substantially in contact with the fluid duct apparatus wall in a manner which seals the first outer fluid duct with respect to a passage of the first fluid through the first outer fluid duct. This is advantageous, since the second supporting element region therefore contributes firstly to the positional securing of the supporting element and secondly to effective sealing of the first outer fluid duct. Therefore, the second supporting element region assumes a dual function in an advantageous way. The first supporting element region and the second supporting element region can preferably be configured in one part. In particular, the at least one supporting element can be configured as a sheet metal component, as a result of which the supporting element can firstly be produced with low complexity and secondly is particularly temperature-resistant. Therefore, the supporting element is particularly highly suitable for use of the heat exchanger as an exhaust gas cooler, in particular an EGR cooler.

In a further advantageous development of the invention, the at least one second supporting element region is of tab-shaped configuration. This is advantageous, since a tab shape of the second supporting element region makes particularly simple sealing possible which can therefore be produced with low complexity. The term "tab-shaped" is to be understood to mean that the second supporting element region is of flat configuration and is plate-shaped. Here, the supporting element and therefore also the second supporting element region can be formed from sheet metal, for example, the second supporting element region having a supporting element region surface which at least substantially closes and, as a result, seals a flow cross section of the first outer fluid duct. Here, the term "substantially closing" is to be understood to mean that it can occur due to manufacture that there is no complete seal between the second supporting element region and the first outer fluid duct, but rather a (clear) gap can lie between the second supporting element region and the first outer fluid duct, through which gap the first fluid can pass in small quantities during use as intended of the heat exchanger.

In a further advantageous development of the invention, the at least one first supporting element region and the at least one second supporting element region enclose an angle with one another which is different than a right angle. This is advantageous, since the angle which is different than the right angle makes an elastic deformation of a connecting region between the first supporting element region and the second supporting element region possible in a simple way, with the result that, in particular, a resilient and therefore reversible deformation of the supporting element can be made possible. The second supporting element region can preferably be inclined counter to a flow direction of the first fluid which prevails during use as intended of the heat exchanger, as a result of which a fluid pressure of the first fluid can reinforce a sealing effect of the second supporting element region, by it being possible for the second supporting element region to be pressed against the fluid duct apparatus wall by way of the fluid pressure.

In a further advantageous development of the invention, the at least one supporting element comprises an additional supporting element region which is connected to the first supporting element region, the additional supporting element region and the second supporting element region being of at least substantially uniform configuration. The additional supporting element region and the second supporting element region can therefore each be of tab-shaped configuration, for example. In addition or as an alternative, the second supporting element region and the additional supporting element region can be arranged at least substantially parallel to one another. Within the context of the present invention, the term "substantially parallel" is to be understood to mean that the second supporting element region and the additional supporting element region are either arranged (precisely) parallel to one another and therefore enclose an intermediate angle of 0° between one another, or enclose an intermediate angle of up to 20° between one another. The second supporting element region and/or the additional supporting element region can preferably be configured as a bulkhead plate.

In a further advantageous development of the invention, the at least one first supporting element region has a bulge which is oriented in the direction of the at least one second supporting element region. This is advantageous, since particularly advantageous positional securing of the supporting element can take place as a result, since the first supporting element region can engage around the first fluid duct wall at least in regions at the bulge.

In a further advantageous development of the invention, the first supporting element region bears at least in regions against the first fluid duct wall in a positively locking manner and, as a consequence of bracing of the supporting element between the fluid duct apparatus wall and the first fluid duct wall, is pressed onto the first fluid duct wall. As a result, firstly particularly reliable sealing of the first outer fluid duct can be achieved, and secondly low-complexity positional securing of the supporting element can be ensured, with the result that, in particular, an undesired offset of the supporting element in the longitudinal extent direction can be prevented.

In a further advantageous development of the invention, the fluid duct apparatus comprises at least one additional supporting element which is arranged so as to lie opposite the at least one supporting element in the vertical extent direction of the fluid duct apparatus, is arranged between a second fluid duct wall of a second outer fluid duct, lying opposite the first outer fluid duct in the vertical extent direction, of the plurality of fluid ducts and the fluid duct apparatus wall, and is of complementary shape at least in regions with respect to the undulating course. This is advantageous, since improved support of the plurality of fluid ducts on the fluid duct apparatus wall and improved sealing can take place by way of the additional supporting element. The plurality of fluid ducts can therefore be braced between the supporting element and the additional supporting element and, as a result, can be positioned exactly, in particular in the vertical extent direction of the fluid duct apparatus.

In a further advantageous development of the invention, the supporting element and the additional supporting element are connected to one another by means of a connecting element which extends in the vertical extent direction. This is advantageous, since improved positional securing of the supporting element and of the additional supporting element can be achieved by way of the connecting element. The supporting element, the additional supporting element and the connecting element can preferably be connected to one another in one part, that is to say can be of single-part configuration, with the result that a complicated subsequent connection can be dispensed with. The supporting element, the additional supporting element and the connecting element can preferably be configured as a sheet metal component.

A second aspect of the invention relates to a fluid duct apparatus for a heat exchanger in accordance with the first aspect to the invention. The fluid duct apparatus has a fluid duct apparatus wall which is configured to separate the first fluid from the second fluid and, at least in regions, delimits a plurality of fluid ducts of the fluid duct apparatus for conducting the first fluid between a fluid inlet region of the heat exchanger and a fluid outlet region of the heat exchanger, at least one of the fluid ducts having an undulating course at least in regions in the longitudinal extent direction of the fluid duct apparatus. It is provided according to the invention that the fluid duct apparatus comprises at least one supporting element which is arranged between a first fluid duct wall, which has the undulating course at least in regions and delimits, at least in regions, a first outer fluid duct of the plurality of fluid ducts, and the fluid duct apparatus wall, and has a first supporting element region which is supported against the first fluid duct wall and is of complementary shape at least in regions with respect to the undulating course. The fluid duct apparatus makes a particularly flexible use of the heat exchanger possible.

A third aspect of the invention relates to a method for producing a fluid duct apparatus in accordance with the second aspect of the invention. The method comprises at least the following steps:

(i) providing the fluid duct apparatus wall which surrounds an interior space of the fluid duct apparatus;

(ii) collectively introducing the plurality of fluid ducts, which are connected to one another, and the at least one supporting element, as a result of which the at least one supporting element is arranged and braced between the first fluid duct wall of the first outer fluid duct of the plurality of fluid ducts and the fluid duct apparatus wall, and is pressed against the first fluid duct wall via the first supporting element region, which is of complementary shape at least in regions with respect to the undulating course, with the configuration of a positively locking connection at least between the first supporting element region and the first fluid duct wall, and with sealing of the first outer fluid duct with respect to a passage of the first fluid.

The fluid duct apparatus produced by way of this method makes a particularly flexible use of the heat exchanger possible.

The fluid duct apparatus wall can surround, in particular encase, the interior space of the fluid duct apparatus at least in regions. The interior space can have an interior space cross section which is oriented perpendicularly with respect to the longitudinal extent direction (that is to say, an interior space cross section which lies in a plane oriented orthogonally with respect to the longitudinal extent direction) and can preferably be of slot-shaped configuration. An interior space cross section of this type which is, in particular, slot-shaped makes receiving and fitting the plurality of fluid ducts in the interior space possible in a simple way, such that the fluid ducts are surrounded at least in regions by the fluid duct apparatus wall.

The preferred embodiments proposed in relation to one of the aspects and their advantages apply mutatis mutandis to the respective other aspects of the invention, and vice versa.

The features and combinations of features mentioned in the description above and the features and combinations of features mentioned in the description of the figures below and/or shown only in the figures can be used not only in the respective specified combination, but rather also in other combinations or on their own, without departing from the scope of the invention.

Further advantages, features and details of the invention result from the claims, the following description of preferred embodiments, and on the basis of the drawings.

BRIEF DESCRIPTION OF THE DRAWINGS

FIG. 3 is a sectional illustration of the fluid duct apparatus in accordance with a sectional line D-D which is shown in FIG. 2;

FIG. 4 is a perspective view of two supporting elements of the fluid duct apparatus which are shown separately;

FIG. 7 is a sectional illustration of the variant of the fluid duct apparatus in accordance with a sectional line C-C which is shown in FIG. 6; and FIG. 8 is a perspective view of two supporting elements of the variant of the fluid duct apparatus, the supporting elements being connected to one another in one part by means of a connecting element.

DETAILED DESCRIPTION OF THE DRAWINGS

In the following text, the invention is explained once more on the basis of one specific exemplary embodiment.

Figure 1:
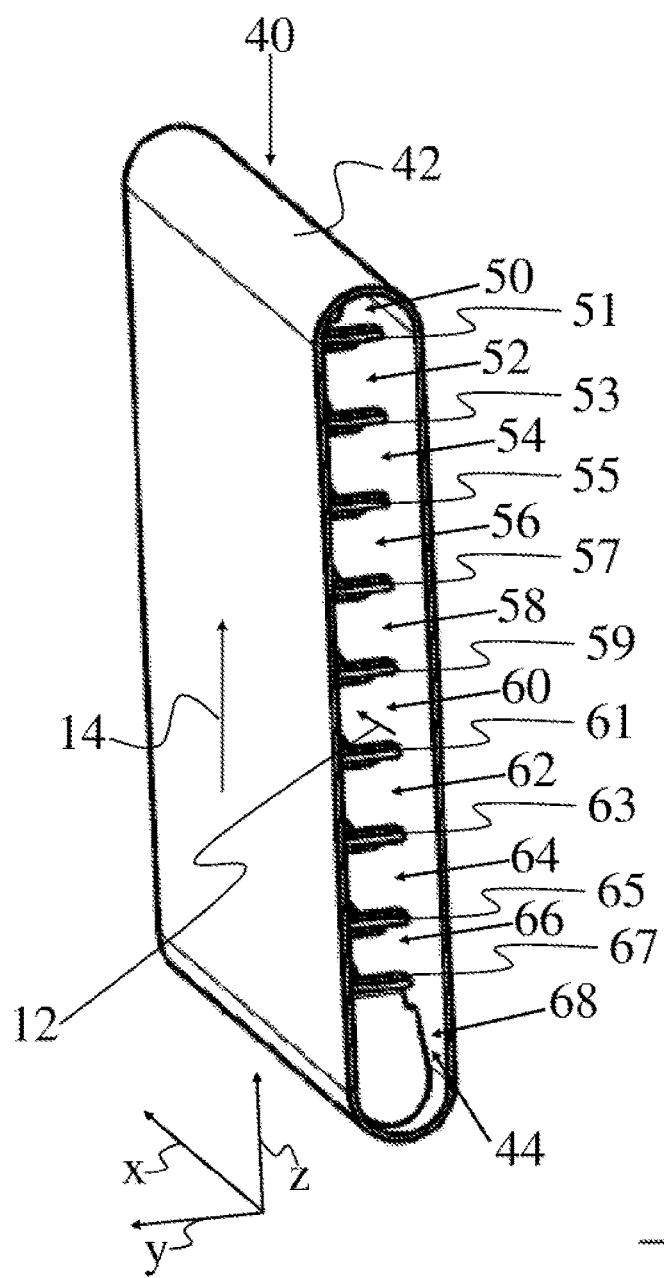
FIG. 1 is a diagrammatic perspective view of a fluid duct apparatus for a heat exchanger.
Figure 2:
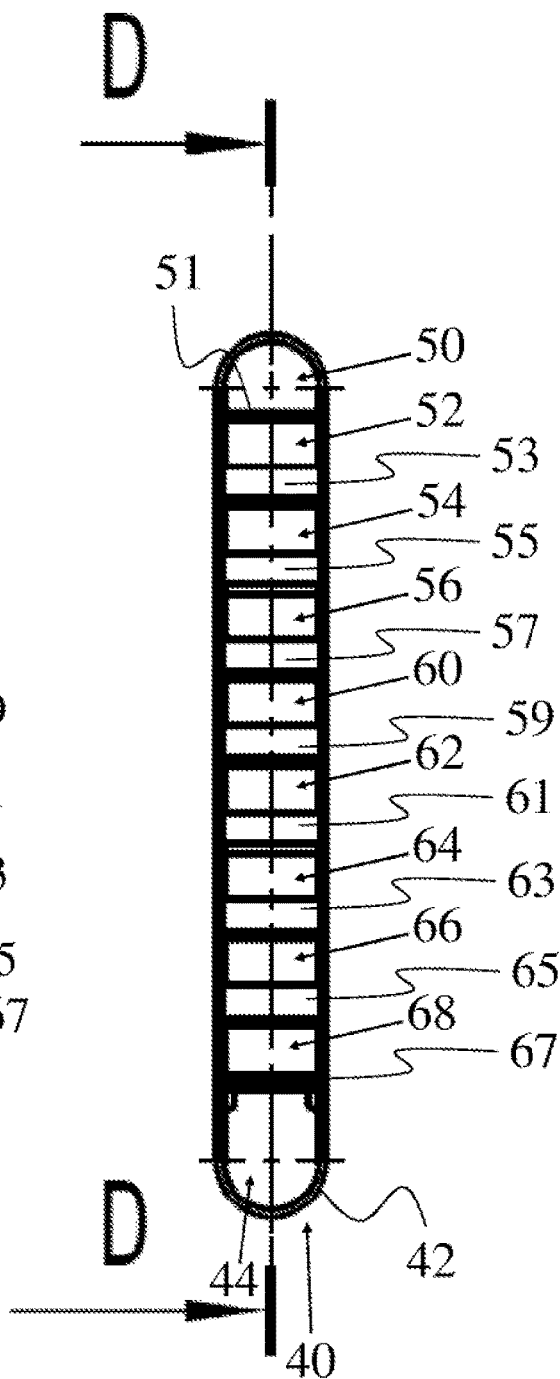
FIG. 2 is a front view of the fluid duct apparatus which is shown in FIG. 1.
Figure 5:
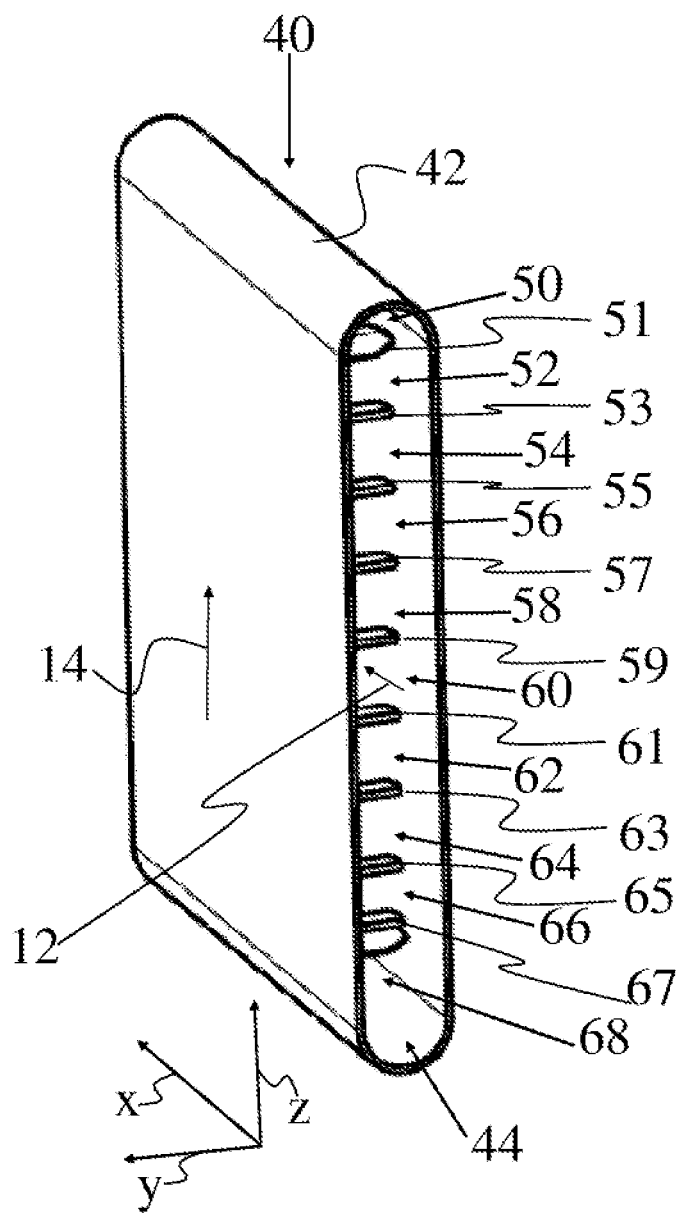
FIG. 5 is a diagrammatic perspective view of one variant of the fluid duct apparatus for the heat exchanger.
Figure 6:
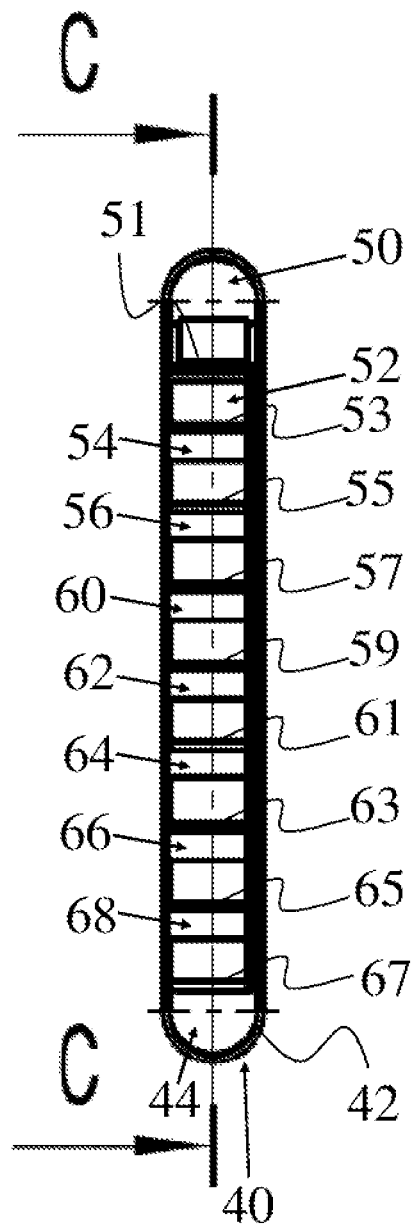
FIG. 6 is a frontal view of that variant of the fluid duct apparatus which is shown in FIG. 5.

FIG. 1 and FIG. 2 show a fluid duct apparatus 40 for a heat exchanger 10 which is shown in part in FIG. 3, for example. FIG. 5 and FIG. 6 show a further variant of the fluid duct apparatus 40 which is likewise configured for the heat exchanger 10. The heat exchanger 10 can be used to cool different fluids 12, 14 of an internal combustion engine (not shown in further detail in the present case). In the present case, the fluids 12, 14 are symbolized by way of respective arrows, and can be conducted, for example, parallel to one another, in an opposed manner with respect to one another, or with the configuration of a cross flow through the heat exchanger 10, to mention only some examples. FIG. 1 and FIG. 5 show two coordinate systems by way of example which illustrate a longitudinal extent direction x, a transverse extent direction y and a vertical extent direction z of the fluid duct apparatus 40 and of the entire heat exchanger 10.

The heat exchanger 10 can generally be configured as what is known as an EGR cooler and can be operated (used) as a cooler of this type. The first fluid 12 of the fluids 12, 14 can be configured as an exhaust gas which is emitted by the internal combustion engine during operation of the latter. The second fluid 14 of the two fluids 12, 14 can be configured as cooling water. The heat exchanger 10 has a plurality of fluid duct apparatuses 40 which are arranged in an interior space part region 25 (see FIG. 3 and FIG. 7) of a housing interior space 24 of a housing 20 of the heat exchanger 10, are arranged next to one another in the transverse extent direction y of the heat exchanger 10 (and therefore also of the fluid duct apparatuses 40), and are received in the housing interior space 24. In the present case, the arrangement of the fluid duct apparatuses 40 of the heat exchanger 10 in the transverse extent direction y next to one another is not shown in further detail. The housing interior space 24 is surrounded by way of a housing wall 22 of the housing 20.

For reasons of clarity, the housing 20 is shown merely in FIG. 3 and FIG. 7 in details.

The first fluid 12 can enter through a fluid inlet region 26 (which can be seen in FIG. 3 and FIG. 7) into the respective fluid duct apparatuses 40, and can exit at a fluid outlet region 28 which lies opposite the fluid inlet region 26 in the longitudinal extent direction x of the heat exchanger 10 (and therefore also of the fluid duct apparatuses 40). During use as intended of the heat exchanger 10, a transfer of heat between the first fluid 12 and the second fluid 14 takes place between the fluid inlet region 26 and the fluid outlet region 28. The second fluid 14 (here, cooling water) can thus flow around the respective fluid duct apparatuses 40 within the housing 20 and in the process can exchange heat with the first fluid 12 (here, exhaust gas) via respective fluid duct apparatus walls 42 which in each case surround the fluid duct apparatuses 40 in regions. The fluid duct apparatus walls 42 can also be called fluid duct apparatus boundary walls. The fluid duct apparatus walls 42 can preferably be formed from sheet metal, and can surround an interior space 44, through which the first fluid 12 can flow and which can have a slot-shaped interior space cross section which can be seen particularly clearly in FIG. 2 and FIG. 6.

The respective fluid duct apparatus walls 42 each surround a plurality of fluid ducts 50, 52, 54, 56, 58, 60, 62, 64, 66, 68 of the fluid duct apparatus 40, these fluid ducts 50, 52, 54, 56, 58, 60, 62, 64, 66, 68 serving to conduct the first fluid 12 between the fluid inlet region 26 and the fluid outlet region 28.

The fluid ducts 50, 52, 54, 56, 58, 60, 62, 64, 66, 68 are each provided in the longitudinal extent direction x of the fluid duct apparatus 40 with an undulating course 110. Here, in the present case, the undulating course 110 results from respective fluid duct walls 51, 53, 55, 57, 59, 61, 63, 65, 67 which delimit the fluid ducts 50, 52, 54, 56, 58, 60, 62, 64, 66, 68 in the vertical extent direction z and likewise have the undulating course 110 at least in regions. In the present case, the fluid duct walls 51, 53, 55, 57, 59, 61, 63, 65, 67 have the undulating course 110 over their respective overall length (in the longitudinal extent direction x).

Each of the fluid duct apparatuses 40 comprises a supporting element 80 which is arranged between a first fluid duct wall 51 of the fluid duct walls 51, 53, 55, 57, 59, 61, 63, 65, 67, which has the undulating course 110 and delimits a first outer fluid duct 50 of the plurality of fluid ducts 50, 52, 54, 56, 58, 60, 62, 64, 66, 68 in regions, and the fluid duct apparatus wall 42, and has a first supporting element region 82 which is supported against the first fluid duct wall 51.

The respective supporting element region 82 is of complementary shape with respect to the undulating course 110 at least in regions, and the respective supporting elements 80 are provided to seal the respective first outer fluid duct 50 with respect to a passage of the first fluid 12.

For sealing purposes, each supporting element 80 has a second supporting element region 86 which is connected in one part to the first supporting element region 82. Here, the second supporting element region 86 which is in each case of tab-shaped configuration is in contact at least substantially with the fluid duct apparatus wall 42 so as to seal the first outer fluid duct 50 with respect to a passage of the first fluid 12 through the first outer fluid duct 50.

The respective first supporting element region 82 and the respective second supporting element region 86 enclose an angle α with one another which is different than a right angle. In the present case, the first supporting element region 86 bears against the first fluid duct wall 51 in a positively locking manner, and is pressed onto the first fluid duct wall 51 as a consequence of bracing of the supporting element 80 between the fluid duct apparatus wall 42 and the first fluid duct wall 51.

It can be seen on the basis of FIG. 3 and FIG. 4 that the supporting elements 80 can comprise an additional supporting element region 88 which, in particular, is connected in one part to the first supporting element region 82. Here, in the present case, the additional supporting element region 88 and the second supporting element region 86 are of uniform configuration and are oriented parallel to one another.

It can be seen clearly on the basis of FIG. 4 and FIG. 8 that the first supporting element region 82 can have a bulge 81 which is oriented in the direction of the second supporting element region 86 and therefore also in the direction of the additional supporting element region 88.

It can likewise be seen particularly clearly on the basis of FIG. 3, FIG. 4, FIG. 7 and FIG. 8 that each fluid duct apparatus 40 can comprise at least one additional supporting element 90 which is arranged so as to lie opposite the respective supporting element 80 in the vertical extent direction z of the fluid duct apparatus 40, and is arranged between a second fluid duct wall 67 of the fluid duct walls 51, 53, 55, 57, 59, 61, 63, 65, 67 of a second outer fluid duct 68, lying opposite the first outer fluid duct 50 in the vertical extent direction z, of the plurality of fluid ducts 50, 52, 54, 56, 58, 60, 62, 64, 66, 68 and the fluid duct apparatus wall 42, and is of complementary shape with respect to the undulating course 110 at least in regions. Just like the first supporting element 80, the additional supporting element 90 is also configured for sealing purposes. While the first supporting element 80 therefore seals the first outer fluid duct 50 with respect to a passage of the first fluid 12, the additional supporting element 90 serves to seal the second outer fluid duct 68 against a passage of the first fluid 12.

It can be seen on the basis of FIG. 7 and FIG. 8 that the supporting element 80 and the additional supporting element 90 can be connected to one another by means of a connecting element 100 which extends in the vertical extent direction z.

The undulating course 110 at the first supporting element region 82 is shaped in such a way that the latter has a bulge 81. This bulge 81 can have at least one extreme point. The properties described in relation to the supporting element 80 also apply directly to the additional supporting element 90 which has a corresponding bulge 91, a corresponding first supporting element region 92, a second supporting element region 96 and an additional supporting element region 98. While, in the case of the supporting element 80, the second supporting element region 86 and the additional supporting element region 88 are each connected to the first supporting element region 82 at a flexibly deformable connecting region 84, the second supporting element region 96 and the additional supporting element region 98 in the case of the additional supporting element 90 are each connected to the first supporting element region 92 at a flexibly deformable connecting region 94.

In summary, the fluid duct apparatuses 40 make a closure of the fluid ducts 50, 68 possible by way of the respective supporting elements 80, 90, as a result of which, during use of the heat exchanger 10 as an EGR cooler, sooting of the fluid ducts 50, 68 during operation of the internal combustion engine and the resulting throughflow of the heat exchanger 10 with the first fluid 12 can be at least largely prevented. On account of their special shaping (undulating course 110), the supporting elements 80, 90 can be held in the respective fluid duct 50, 68 such that they bear against the fluid duct walls 51, 67 in a positively locking manner. The fluid duct walls 51, 53, 55, 57, 59, 61, 63, 65, 67 can generally also be called heat exchanger fins. Individual insertion of the individual supporting elements 80, 90, which particularly slows down the cycle time, can be avoided by way of the described method for producing the fluid duct apparatuses 40. Instead, in accordance with the method, the supporting elements 80, 90 can be introduced together with the fluid ducts 50, 52, 54, 56, 58, 60, 62, 66, 68 into the interior space 44 which is surrounded by the respective fluid duct apparatus wall 42, and can be supported on the fluid duct apparatus wall 42.

As a result of the positively locking positioning of the supporting elements 80, 90 which can also be called closure components or sealing elements, the supporting elements 80, 90 are held in position by the cooler fin which is present (here, a fluid duct wall 51 and 67).

Overall, the closure components 80, 90 (supporting elements 80, 90) are also introduced together with the cooler fins (fluid duct walls 51, 53, 55, 57, 59, 61, 63, 65, 67) into the fluid duct apparatus wall 42 which is also called a heat exchanger tube or a cooler tube, with the result that no additional insertion of the closure components 80, 90 in a separate process is required. Furthermore, the cooler fins 51, 53, 55, 57, 59, 61, 63, 65, 67 are positioned by way of the positively locking positioning of the closure components 80, 90 in the cooler tube (fluid duct apparatus wall 42). Moreover, tighter tolerances of the closure components 80, 90 with respect to the cooler tube 42 than is customary in the case of previous, conventional heat exchangers can be realized by way of the common introduction of the closure components 80, 90 with the cooler fins 51, 53, 55, 57, 59, 61, 63, 65, 67.

LIST OF DESIGNATIONS

10 Heat exchanger
12 First fluid
14 Second fluid
20 Housing
22 Housing wall
24 Housing interior space
25 Interior space part region
26 Fluid inlet region
28 Fluid outlet region
40 Fluid duct apparatus
42 Fluid duct apparatus wall
44 Interior space
50 Fluid duct
51 First fluid duct wall
52 Fluid duct
53 Fluid duct wall
54 Fluid duct
55 Fluid duct wall
56 Fluid duct
57 Fluid duct wall
58 Fluid duct
59 Fluid duct wall
60 Fluid duct
61 Fluid duct wall
62 Fluid duct
63 Fluid duct wall
64 Fluid duct
65 Fluid duct wall
66 Fluid duct
67 Second fluid duct wall
68 Fluid duct
80 Supporting element
81 Bulge
82 First supporting element region
84 Connecting region
86 Second supporting element region
88 Additional supporting element region
90 Additional supporting element
91 Bulge
92 First supporting element region
94 Connecting region
96 Second supporting element region
98 Additional supporting element region
100 Connecting element
110 Undulating course
α Angle
x Longitudinal extent direction
y Transverse extent direction
z Vertical extent direction

What is claimed is:

1. A heat exchanger for an internal combustion engine for transfer of heat between at least two fluids, comprising:
   at least one housing which has at least one housing wall and a housing interior space which is delimited at least in regions by the housing wall and has a fluid inlet region for introducing a first fluid of the at least two fluids into the housing interior space and a fluid outlet region for discharging the first fluid from the housing interior space;
   at least one fluid duct apparatus which is arranged in an interior space part region of the housing interior space and has a fluid duct apparatus wall which is configured to separate the first fluid from a second fluid and, at least in regions, delimits a plurality of fluid ducts of the fluid duct apparatus for conducting the first fluid between the fluid inlet region and the fluid outlet region, at least one of the fluid ducts having an undulating course at least in regions in a longitudinal extent direction of the fluid duct apparatus, wherein
   the fluid duct apparatus comprises at least one supporting element which is arranged between a first fluid duct wall, which has the undulating course at least in regions and delimits a first outer fluid duct of the plurality of fluid ducts at least in regions, and the fluid duct apparatus wall,
   the at least one supporting element comprising a first supporting element region which is supported against the first fluid duct wall and is of complementary shape at least in regions with respect to the undulating course, and
   the at least one supporting element sealing the first outer fluid duct with respect to a passage of the first fluid,
   wherein the at least one supporting element comprises at least one second supporting element region which is connected to the first supporting element region and is at least substantially in contact with the fluid duct apparatus wall in a manner which seals the first outer fluid duct with respect to a passage of the first fluid through the first outer fluid duct.

2. The heat exchanger according to claim 1, wherein the at least one second supporting element region has a tab-shaped configuration.

3. The heat exchanger according to claim 1, wherein the at least one first supporting element region and the at least one second supporting element region enclose a non-right angle with one another, as measured from a connecting region between the at least one first supporting element region and the at least one second supporting element region.

4. The heat exchanger according to claim 1, wherein the at least one supporting element comprises an additional supporting element region which is connected to the first supporting element region,
   the additional supporting element region and the second supporting element region are of substantially uniform configuration.

5. The heat exchanger according to claim 1, wherein the at least one first supporting element region has a bulge which is oriented in the direction of the at least one second supporting element region.

6. The heat exchanger according to claim 1, wherein the first supporting element region bears at least in regions against the first fluid duct wall in a positively locking manner and, as a consequence of bracing of the supporting element between the fluid duct apparatus wall and the first fluid duct wall, is pressed onto the first fluid duct wall.

7. The heat exchanger according to claim 1, wherein the fluid duct apparatus further comprises:
at least one additional supporting element which is arranged so as to lie opposite the at least one supporting element in a vertical extent direction of the fluid duct apparatus, is arranged between a second fluid duct wall of a second outer fluid duct, lying opposite the first outer fluid duct in the vertical extent direction, of the plurality of fluid ducts and the fluid duct apparatus wall, and is of complementary shape at least in regions with respect to the undulating course.

8. The heat exchanger according to claim 7, wherein the supporting element and the additional supporting element are connected to one another by a connecting element which extends in the vertical extent direction.

9. A fluid duct apparatus for a heat exchanger having a housing with a housing wall and a housing interior space delimited at least in regions by the housing wall and having a fluid inlet region for introducing a first fluid into the housing interior space and a fluid outlet region for discharging the first fluid from the housing interior space,
the fluid duct apparatus comprising:
a fluid duct apparatus wall which is configured to separate the first fluid from a second fluid and, at least in regions, delimits a plurality of fluid ducts of the fluid duct apparatus for conducting the first fluid between the fluid inlet region of the heat exchanger and the fluid outlet region of the heat exchanger, at least one of the fluid ducts having an undulating course at least in regions in the longitudinal extent direction of the fluid duct apparatus;
at least one supporting element which is arranged between a first fluid duct wall, which has the undulating course at least in regions and delimits, at least in regions, a first outer fluid duct of the plurality of fluid ducts, and the fluid duct apparatus wall, and has a first supporting element region which is supported against the first fluid duct wall and is of complementary shape at least in regions with respect to the undulating course, the at least one supporting element being provided to seal the first outer fluid duct with respect to a passage of the first fluid, and a second supporting element region which is connected to the first supporting element region and is at least substantially in contact with the fluid duct apparatus wall in a manner which seals the first outer fluid duct with respect to a passage of the first fluid through the first outer fluid duct.

10. A method for producing a fluid duct apparatus, the method comprising the steps of:
providing a fluid duct apparatus wall which surrounds an interior space of the fluid duct apparatus, the fluid duct apparatus wall being configured to separate a first fluid from a second fluid and, at least in regions, delimiting a plurality of fluid ducts of the fluid duct apparatus for conducting the first fluid between a fluid inlet region of a heat exchanger and a fluid outlet region of the heat exchanger, at least one of the fluid ducts having an undulating course at least in regions in the longitudinal extent direction of the fluid duct apparatus, wherein at least one supporting element which is arranged between a first fluid duct wall, which has the undulating course at least in regions and delimits, at least in regions, a first outer fluid duct of the plurality of fluid ducts, and the fluid duct apparatus wall, and has a first supporting element region which is supported against the first fluid duct wall and is of complementary shape at least in regions with respect to the undulating course, the at least one supporting element being provided to seal the first outer fluid duct with respect to a passage of the first fluid, and a second supporting element region which is connected to the first supporting element region and is at least substantially in contact with the fluid duct apparatus wall in a manner which seals the first outer fluid duct with respect to a passage of the first fluid through the first outer fluid duct;
collectively introducing the plurality of fluid ducts, which are connected to one another, and the at least one supporting element, as a result of which the at least one supporting element is arranged and braced between the first fluid duct wall of the first outer fluid duct of the plurality of fluid ducts and the fluid duct apparatus wall, and is pressed against the first fluid duct wall via the first supporting element region, which is of complementary shape at least in regions with respect to the undulating course, with the configuration of a positively locking connection at least between the first supporting element region and the first fluid duct wall, and with sealing of the first outer fluid duct with respect to a passage of the first fluid.

* * * * *